(12) United States Patent
Osotio et al.

(10) Patent No.: US 10,235,456 B2
(45) Date of Patent: *Mar. 19, 2019

(54) AUDIO AUGMENTED REALITY SYSTEM

(71) Applicant: Microsoft Technology Licensing, LLC, Redmond, WA (US)

(72) Inventors: Neal Osotio, Sammamish, WA (US); Angela Moulden, Ravensdale, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,002

(22) Filed: Mar. 25, 2018

(65) Prior Publication Data

US 2018/0210951 A1 Jul. 26, 2018

Related U.S. Application Data

(63) Continuation of application No. 15/194,570, filed on Jun. 28, 2016, now Pat. No. 9,959,342.

(51) Int. Cl.
*H04R 3/00* (2006.01)
*G06F 17/30* (2006.01)
(Continued)

(52) U.S. Cl.
CPC ...... *G06F 17/30743* (2013.01); *G01S 3/8083* (2013.01); *G06F 3/162* (2013.01);
(Continued)

(58) Field of Classification Search
CPC .. G06F 17/30; G06F 17/3033; G06F 17/3074; G06F 17/30743; G06F 17/30755; G06F 17/30758; G06F 17/30778; G06F 17/30769; G06F 3/162; G06F 3/165; G10L 25/51; G10L 25/54; G10L 25/45; G10L 25/18; G10L 25/21; G10L 25/72; G10L 13/00; G10L 19/02; G10L 19/0212;
(Continued)

(56) References Cited

U.S. PATENT DOCUMENTS

2008/0270344 A1* 10/2008 Yurick ............. G06F 17/30026
2010/0211693 A1* 8/2010 Master ............. G06F 17/30743
709/238

(Continued)

*Primary Examiner* — Thang V Tran
(74) *Attorney, Agent, or Firm* — Law Offices of Richard Chi; Richard Chi

(57) ABSTRACT

Techniques for online information search and retrieval for a query including a digital audio waveform. In an aspect, an audio waveform is received and digitized by at least one of a plurality of audio input devices. The digitized audio waveforms are transmitted to a central processing unit, which formulates and submits a query to an online engine. The formulated query may include the at least one digital audio waveform. The online engine retrieves one or more online results relevant to the formulated query. The online results may include one or more relevant visual results, and/or one or more relevant audio results. The retrieved results are served in real-time back to a user, via a device having audio output capability, and/or a device having visual data output capability.

20 Claims, 8 Drawing Sheets

(51) Int. Cl.
*H04R 29/00* (2006.01)
*G06F 3/16* (2006.01)
*G10L 13/00* (2006.01)
*G01S 3/808* (2006.01)
*G10L 25/54* (2013.01)

(52) U.S. Cl.
CPC .......... *G06F 3/165* (2013.01); *G06F 17/3074* (2013.01); *G06F 17/30755* (2013.01); *G06F 17/30769* (2013.01); *G10L 25/54* (2013.01); *G10L 13/00* (2013.01)

(58) Field of Classification Search
CPC ......... G10L 19/038; H04R 3/00; H04R 3/005; G01S 3/8083
See application file for complete search history.

(56) References Cited

U.S. PATENT DOCUMENTS

| | | | |
|---|---|---|---|
| 2012/0059814 A1* | 3/2012 | Sejnoha | G06F 17/30864 707/707 |
| 2013/0124495 A1* | 5/2013 | Sejnoha | G06F 17/30864 707/707 |
| 2016/0196343 A1* | 7/2016 | Rafii | G06F 17/3033 707/730 |
| 2016/0247512 A1* | 8/2016 | Duong | G10L 25/48 |

* cited by examiner

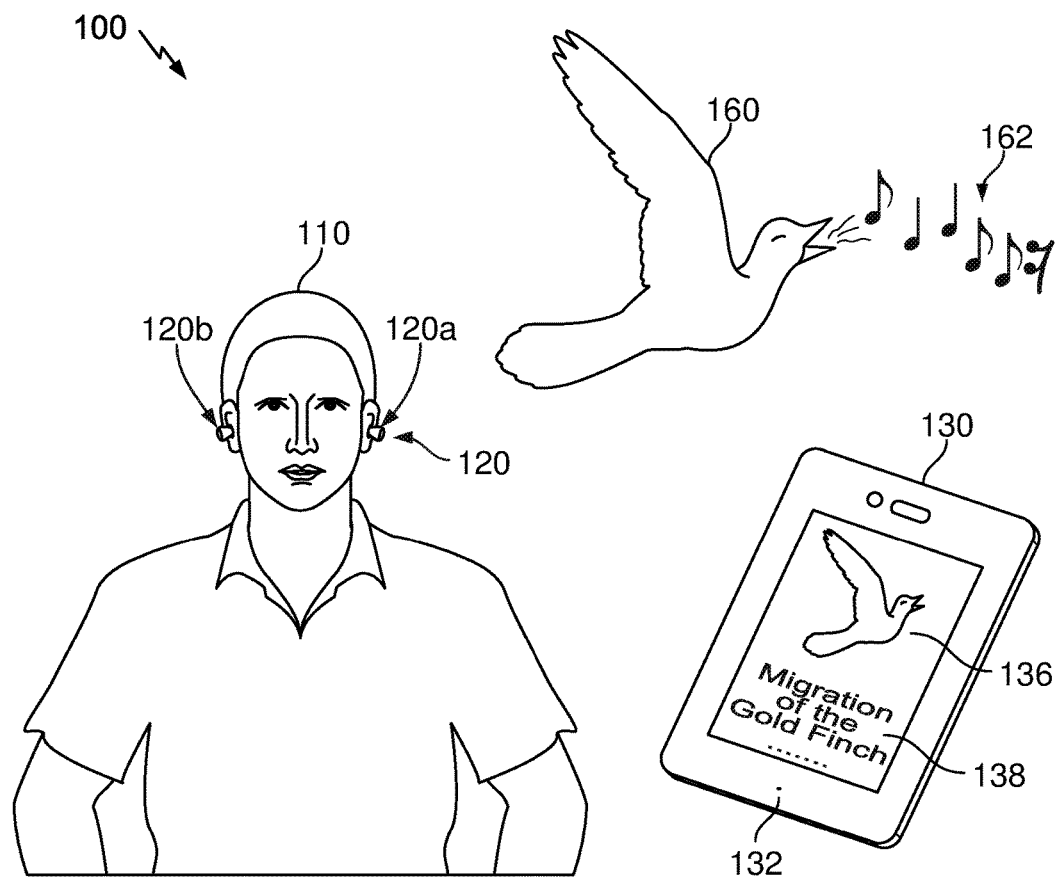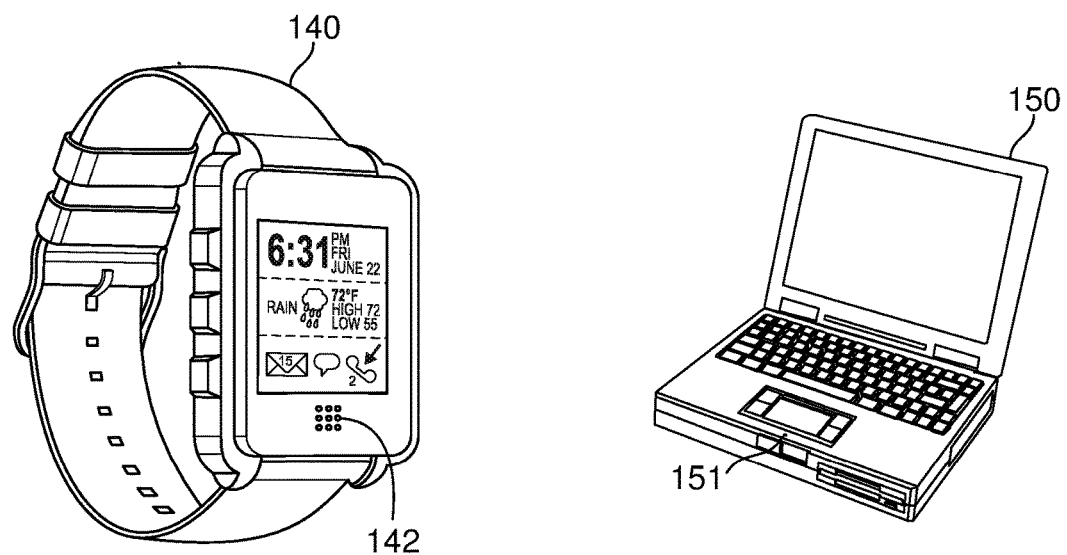
FIG 1

| Example Formulated Query 428.1a | Example Retrieved Results 430a |
|---|---|
| Sound File 1 (Mp3) [graph at t₁]<br>Device1 Attributes: Smartphone, 18 kbps Sampling, GPS Coordinates 1 | Visual [bird image]<br>Migration of the Goldfinch: The Goldfinch is a Small Bird Migrating from Canada to Mexico During the Winter... |
| Sound File 2 (Wave) [graph at t₂]<br>Device2 Attributes: Laptop, .22 kbps Sampling, GPS Coordinates 2 | Audio<br>"The Goldfinch is a Small Bird Migrating from Canada to Mexico During the Winter..." |
| Sound File 3 (Mp3) [graph at t₃]<br>Device3 Attributes: Earbuds, .30 kbps Sampling, GPS Coordinates 3 | Personalized Audio<br>[graph] Users' Favorite Song<br>+<br>[graph] Goldfinch Sound File |
| Other Parameters: User Identity, User Profile, Ambient Temperature, Previous Search History... | |

FIG 5

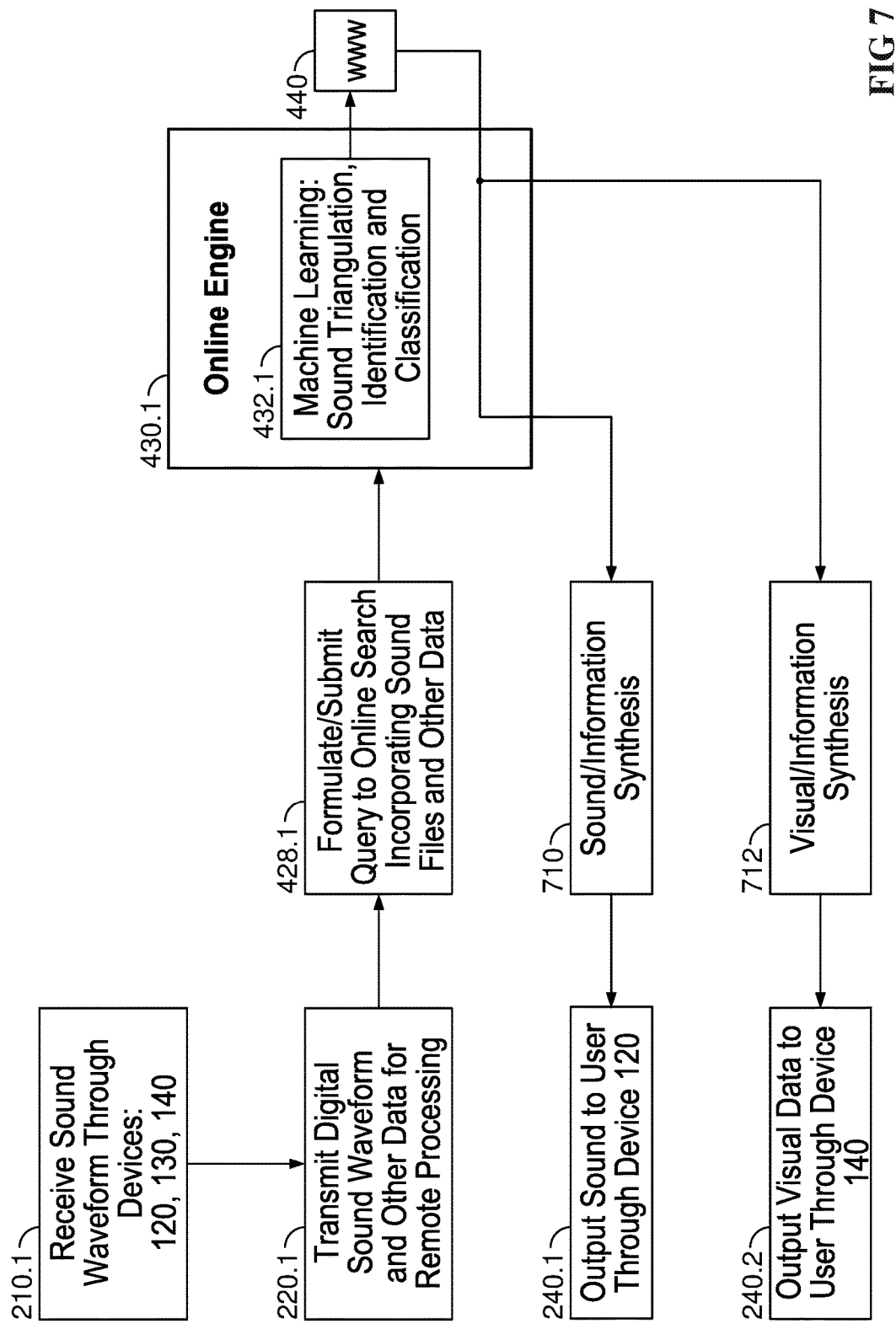

AUDIO AUGMENTED REALITY SYSTEM

BACKGROUND

With the advent of technology for processing environmental input and communicating information in real time, the use of augmented reality systems in consumer, business, academic, and research settings will be increasingly widespread. In an audio augmented reality system, users may be presented with real-time information through one or more audio channels, e.g., earphones, speakers, or other audio devices. To enhance the performance of audio augmented reality systems, it would be desirable to provide techniques to increase the relevance and accuracy of the real-time information presented.

BRIEF DESCRIPTION OF THE DRAWINGS

FIG. 1 illustrates a first scenario showing various aspects of the present disclosure.

FIG. 5 shows an illustrative correspondence between an exemplary formulated query and exemplary retrieved results.

FIG. 7 illustrates an exemplary application of the techniques described hereinabove with reference to an audio augmented reality system to specific scenario.

DETAILED DESCRIPTION

Figure 2:
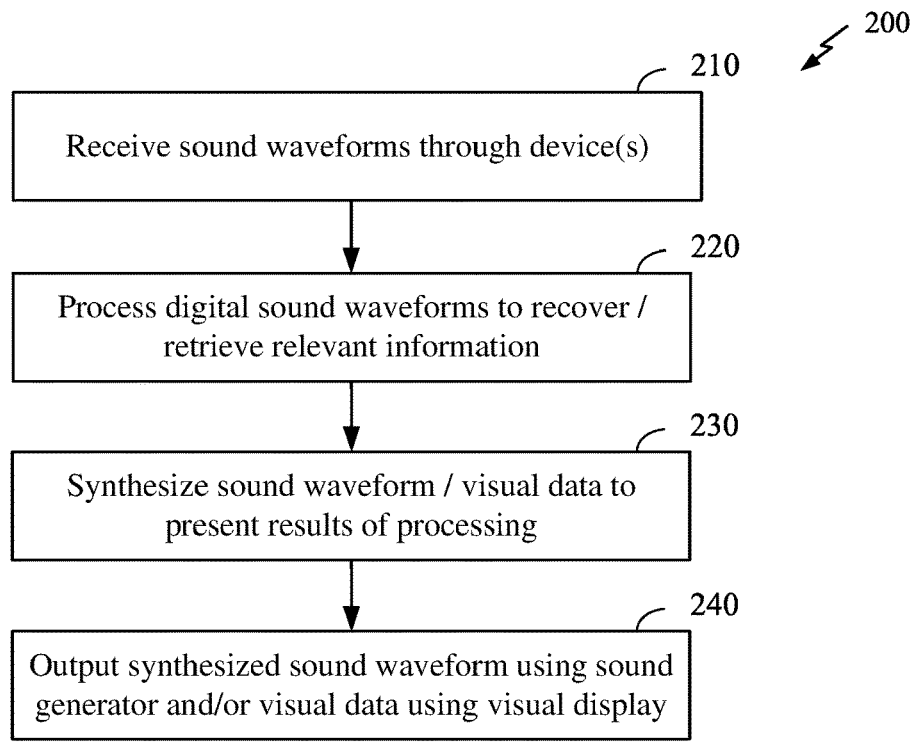
FIG. 2 illustrates an exemplary sequence of functional blocks illustrating certain aspects of the present disclosure.

Various aspects of the technology described herein are generally directed towards techniques for search and retrieval of online information responsive to a query that includes a digital audio waveform. In particular, the query is submitted to an online engine, and may include a plurality of digital audio waveforms. One or more online results relevant to the formulated query are retrieved, and presented in audio and/or visual format to the user in real-time. Based on user feedback, the relevance of online results may be improved over time using machine learning algorithms.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

FIG. 1 illustrates a first scenario 100 showing various aspects of the present disclosure. Note scenario 100 is shown for illustrative purposes only, and is not meant to limit the scope of the present disclosure, e.g., to any particular types of audio signals that can be processed, devices for capturing or outputting audio input, specific knowledge areas, search results, any types of information shown or suggested, or any illustrative scenario such as bird-watching or any other specific scenario.

In FIG. 1, a plurality of devices is shown, including active earbuds 120 (including left 120a and right 120b earbuds), smartphone 130, smartwatch 140, laptop computer 150, etc. User 110 is illustratively depicted as listening to the audio output of active earbuds 120. In an exemplary embodiment, each of (left and right) active earbuds 120 may include a built-in microprocessor (not shown). Earbuds 120 may be configured to sample live audio, and, using the built-in microprocessor, process the sampled audio, and further generate audio output that modifies, enhances, or otherwise augments the live audio also being heard by the user in real-time.

It will be appreciated that any of the devices shown may be equipped with the capability to generate audio output for user 110, and/or receive audio input from the environment of user 110. For example, to receive audio input, active earbuds 120 may be provided with built-in microphones or other types of sound sensors (not shown in FIG. 1), smartphone 130 may include microphone 132, smartwatch 140 may include microphone 142, laptop computer 150 may include microphone 151, etc.

In first illustrative scenario 100, user 110 may be on a walk while in possession of any or all of devices 120, 130, 140, and/or 150. User 110 may happen to encounter a bird 160 singing a bird song 162. User 110 may perceive bird 160 through his or her visual and/or audio senses, i.e., sight and/or sound. In such a scenario, user 110 might desire to obtain additional information regarding bird 160 and/or bird song 162, e.g., identity and other information of the bird species, location of the bird relative to user 110 (e.g., if only song 162 were heard but bird 160 was not visible), etc. Note the example of bird-watching is described for illustrative purposes only, and is not meant to limit the scope of the present disclosure to any particular types of sounds or information that may be processed. In alternative exemplary embodiments, any sound waveforms may be accommodated, including, but not limited to, music (e.g., identification of music type, band, performers, etc.), speech (e.g., identification of speaker, natural language comprehension, translation, etc.), artificial (e.g., identification of sirens, emergency calls, etc.) or natural sounds, etc. Such alternative exemplary embodiments are contemplated to be within the scope of the present disclosure.

Furthermore, devices 120, 130, 140, 150 need not all be in the possession of user 110. For example, while earbuds 120 may be in the possession of and in the vicinity of user 110, laptop computer 150 may not belong to the user, and/or may generally be located within or outside the immediate vicinity of user 110. According to the techniques of the present disclosure, it may generally suffice for the devices to be in the same general environment of the user, e.g., such that the devices may each provide useful input on particular sounds perceived by user 110.

It will be appreciated that any of devices 120, 130, 140, 150 may possess the capability to connect to a local network or to the World Wide Web, while user 110 is observing bird 160 or listening to bird song 162. User 110 may utilize such connectivity to, e.g., access the network or the Web to retrieve the desired information on bird 160 or bird song 162. In an exemplary embodiment, user 110 may verbally articulate or otherwise input a query, and any of devices 120, 130, 140, 150 may submit the formulated query to one or more databases located on such network or on the World Wide Web, to retrieve relevant information. In an exemplary embodiment, such databases may correspond to a search engine, e.g., an Internet search engine.

It will be appreciated, however, that in certain scenarios, if user 110 does not possess specialized knowledge regarding a subject, then it would be difficult for user 110 to adequately formulate a query to obtain the desired information from an online search engine, even if such a search engine were accessible through, e.g., devices 130, 140, 150. For example, if user 110 had seen bird 160 and identified certain colors or other characteristics of the bird, then user 110 may be able to formulate a suitable text query for a search engine to identify bird 160. However, if user 110 only hears bird song 162 without having seen bird 160, then it would be difficult for user 110 to formulate a suitable text query. User 110 might also encounter a similar dilemma when presented with other types of sounds, e.g., unfamiliar or barely audible languages spoken by human speakers, unfamiliar music which user 110 desires to identify, etc.

Accordingly, it would be desirable to provide a system that can automatically retrieve and present information relevant to sounds perceived by a user in his or her environment, without requiring the user to explicitly formulate a query for such information.

In an exemplary embodiment, one or more devices in the user's environment may receive audio input corresponding to the sound perceived by the user. For example, any or all of devices 120, 130, 140, 150 may possess audio input capability, and may capture bird song 162 using its corresponding audio input mechanism (e.g., built-in microphone of active earbuds 120, microphone 132 of smartphone 130, etc.). The received audio input may be communicated from the receiving devices to a central device, which may automatically formulate a query based on the received sound waveforms and submit such query to an online search engine (also denoted "online engine" herein). Based on the formulated query, the online engine may retrieve information identifying bird 160, along with specific characteristics of bird song 162 received by the devices, using the techniques described hereinbelow.

The retrieved information may then be presented to user 110 through one or more presentation modalities, including, e.g., synthesized voice audio through earbuds 120, and/or audio output by speakers (not shown) present on any of devices 130, 140, 150, and/or visual presentations on any of devices 130, 140, 150 possessing an accommodating display. For example, as shown on the display of smartphone 130, graphic and text 132 identifying bird 160 may be displayed, along with other in-depth textual description 134.

Further described hereinbelow are techniques for implementing a system having the capabilities described hereinabove. FIG. 2 illustrates an exemplary sequence 200 of functional blocks illustrating certain aspects of the present disclosure. Note FIG. 2 is shown for illustrative purposes only, and is not meant to limit the scope of the present disclosure. For example, sequence 200 need not be performed by a single device, and the operations described may be distributed across devices. Furthermore, in alternative exemplary embodiments, any blocks in sequence 200 may be modified, omitted, or rearranged in different sequence. Such alternative exemplary embodiments are contemplated to be within the scope of the present disclosure.

In FIG. 2, at block 210, sound waveforms are received through one or more devices. In an exemplary embodiment, such devices may include any device having audio input and sound digitization capability, that may be in communication with the other devices. For example, in scenario 100, such devices may include any or all of devices 120, 130, 140, 150.

At block 220, the digital sound waveforms are processed to recover and/or retrieve relevant information. In an exemplary embodiment, the digital sound waveforms may be processed in conjunction with other input data such as parameters related to user profile, e.g., usage patterns of the user to whom subsequent information is to be presented, geographical location of the device(s) as determined by Global Positioning System (GPS) and/or other techniques, other parameters, etc.

In an exemplary embodiment, processing at block 220 may include correlating one or more digital sound waveforms with an online repository of sounds or sound models, to identify one or more characteristics of the sound waveforms. For example, in the exemplary scenario 100 wherein user 110 hears a bird song 162, the sound waveforms received by each device may correspond to, e.g., a first audio version of bird song 162 received by earbuds 120, a second audio version of bird song 162 received by smartphone 130, a third audio version of bird song 162 received by smartwatch 140, etc.

In an exemplary embodiment, the digital waveforms may be communicated to a single processing unit, e.g., running on any of devices 120, 130, 140, 150. In an alternative exemplary embodiment, the digital sound waveforms may be communicated to an online engine such as further described hereinbelow, e.g., directly or via an intermediate server or processor running on any of devices 120, 130, 140, 150, or any other devices. In an exemplary embodiment, the one or more digital sound waveforms may be incorporated in a digital-sound-enabled query for an online engine, and relevant information may be recovered and/or retrieved from, e.g., the World Wide Web, using online search engine techniques.

It will be appreciated that relevant information may correspond to any type of information classified as relevant to the query by the online search engine. For example, relevant information may include identification of characteristics of the sound waveforms (e.g., "the song you are listening to is sung by a goldfinch"), other related information (e.g., "the goldfinch is resident in certain parts of Northern California during the summer time," geographical source of the received sound waveforms (e.g., "goldfinch song originating from 100 feet northwest"), such as may be adduced from triangulation of sounds received by multiple ones of devices 120, 130, 140, 150, etc., as further described hereinbelow.

At block 230, an output sound waveform and/or visual data may be synthesized to present the results of the processing at block 220 to the user. In an exemplary embodiment, an output sound waveform may include an artificial voice-synthesized version of the information to be presented, e.g., "the song you are listening to is sung by a goldfinch . . . ." In an exemplary embodiment, visual data may include relevant text or graphic data to be presented to the user on a device having a display. A sound waveform and/or visual data may be synthesized, e.g., by the online engine as described hereinbelow, or such data may be synthesized locally by the devices available to the user, etc.

At block 240, the synthesized sound waveform may be output using a sound generator local to the user, and/or synthesized visual data may be output using a visual display of a device local to the user. In an exemplary embodiment, the synthesized sound waveform may be output using active earbuds 120. For example, in scenario 100, assuming user 110 hears song 162 sung by bird 160 in real-time, active earbuds 120 may output a synthesized text-to-speech rendering of information related to song 162, e.g., "the song you are listening to is sung by a goldfinch, located 100 feet northwest of your current location," etc.

Figure 3:
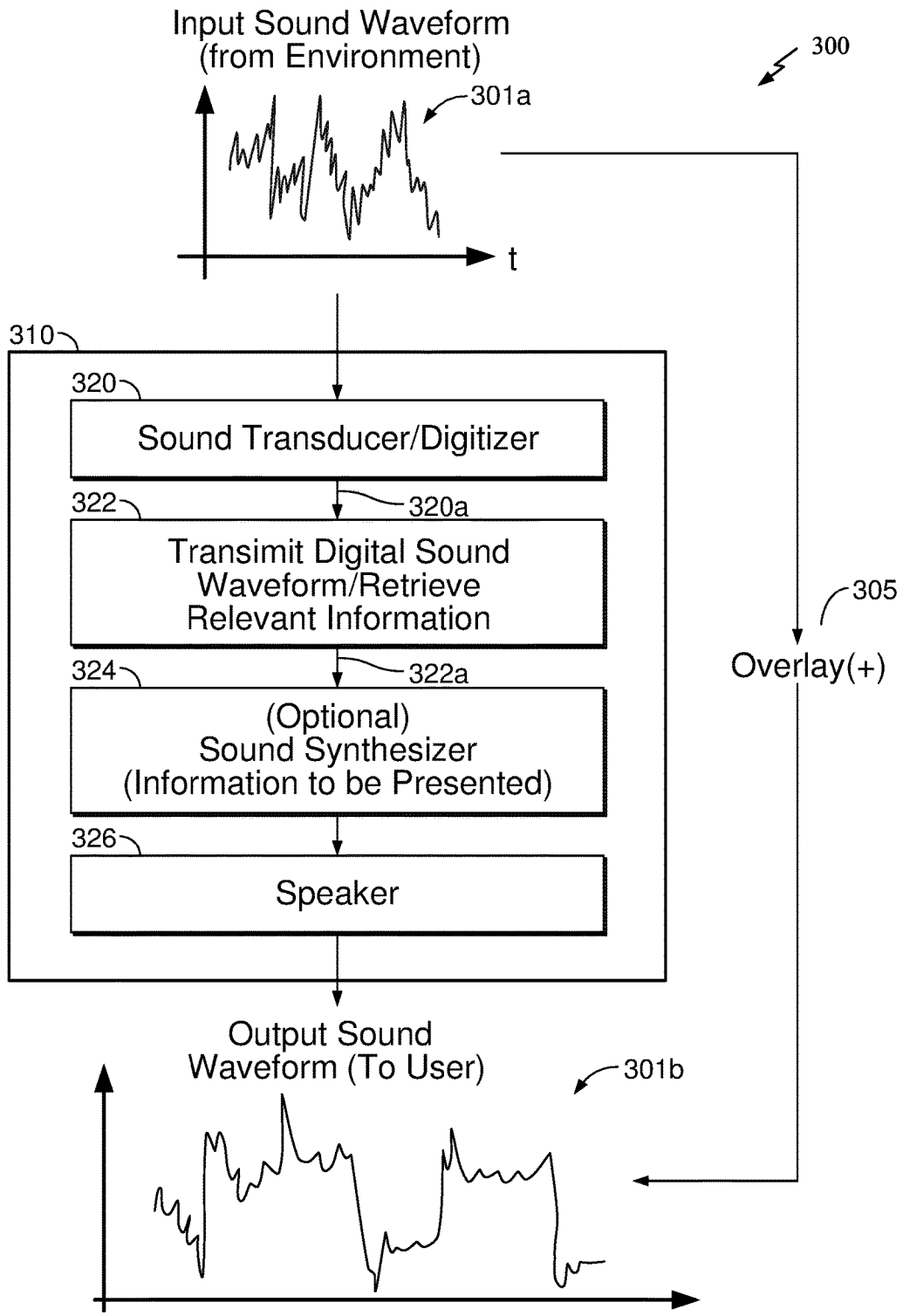
FIG. 3 illustrates an exemplary embodiment of operations performed by an audio input and/or output device locally available to the user.

FIG. 3 illustrates an exemplary embodiment 300 of operations performed by an audio input and/or output device locally available to the user. In an exemplary embodiment, such a device may correspond to, e.g., active earbuds 120, or generally to any of devices 130, 140, 150. Note FIG. 3 is shown for illustrative purposes only, and is not meant to limit the scope of the present disclosure to any particular implementation of the techniques described herein.

In FIG. 3, an input sound waveform from the user's environment is represented by a graphic 301a corresponding to a sound-pressure-versus-time plot of the waveform. Sound waveform 301a is received by an audio input and/or output device 310, having a front-end stage corresponding to a sound transducer/digitizer block 320.

Block 320 converts sound waveform 301a into a digital sound waveform 320a.

Block 322 performs operations resulting in the recovering or retrieving of relevant information from digital sound waveform 320a. In particular, block 322 may transmit the received digital sound waveform to a central processing unit (not shown in FIG. 3) or an online engine, and optionally receive relevant information 322a from the central processing unit or online engine if device 310 is capable of presenting the information to the user. Specific exemplary operations performed by block 322, e.g., in conjunction with other modules with which block 322 communicates, are further described hereinbelow with reference to FIG. 4.

In an exemplary embodiment, device 310 may optionally include block 324 for synthesizing sound based on information retrieved from block 322. Block 324 may include, e.g., a text-to-speech module for locally synthesizing an artificial voice waveform from the information, for presentation to the user. In an alternative exemplary embodiment, block 324 may be omitted, and text-to-speech synthesis of information may be performed remotely from device 310, e.g., by an online engine. In such cases, the retrieved information 322a may be understood to already contain the synthesized sound information to be presented. Such alternative exemplary embodiments are contemplated to be within the scope of the present disclosure.

At block 326, speaker 326 generates an audio output 301b from the synthesized sound information received, e.g., from block 322 or from block 324. Audio output 301b may correspond to an output sound waveform played back to the user.

In view of the description hereinabove, it will be appreciated that a user of device 310 may simultaneously perceive audio originating from two sources: input sound waveform 301a originating from the "real" (extra-device 310) environment of the user, and output sound waveform 301b originating from speaker 326 of device 310. In this sense, output sound waveform 301b may be understood as being "overlaid" 305 or "augmenting" input sound waveform 301a.

Figure 4:
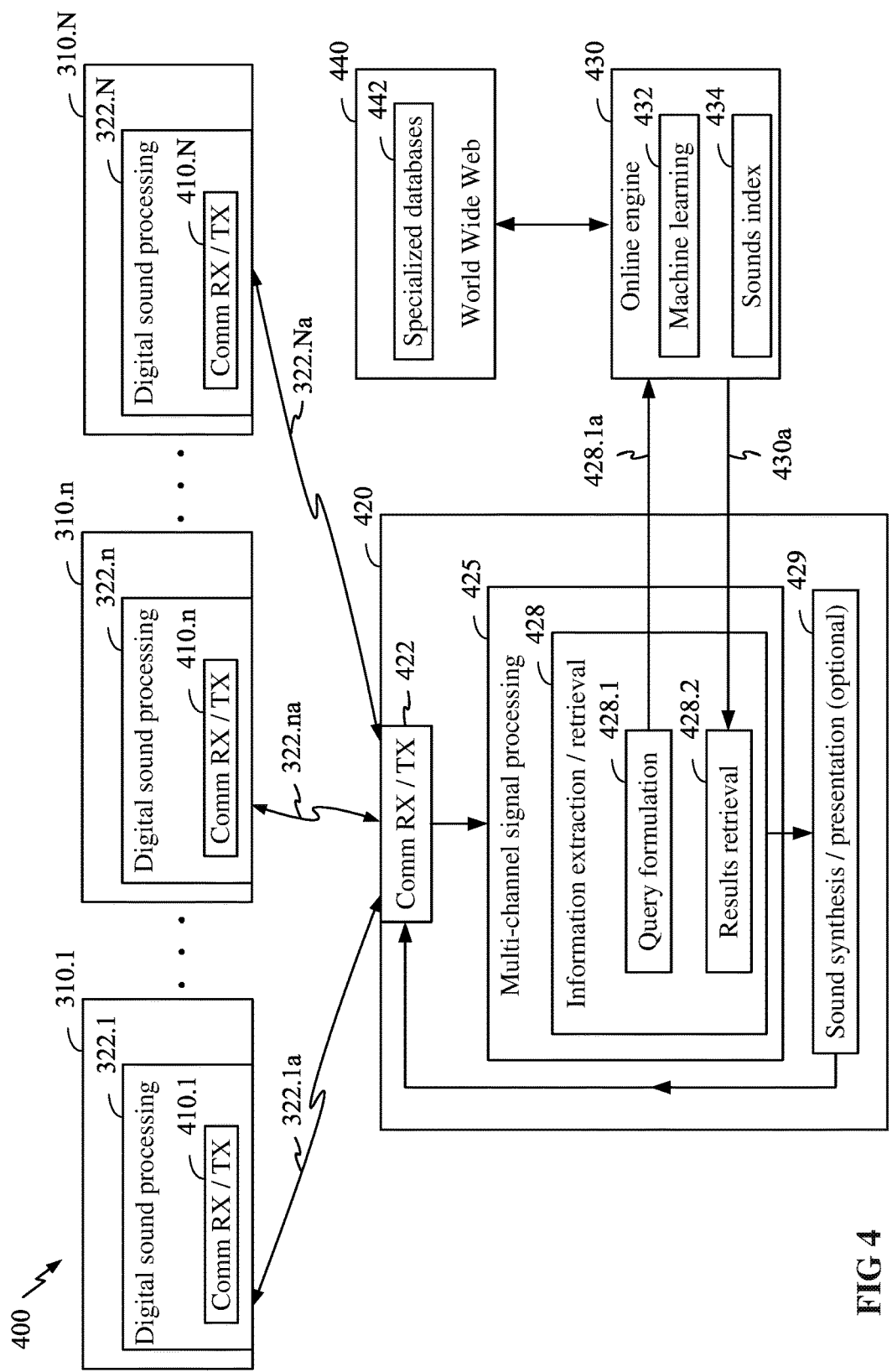
FIG. 4 illustrates further aspects of an audio augmented reality system for recovering and retrieving relevant information.

FIG. 4 illustrates further aspects of an audio augmented reality system for recovering and retrieving relevant information, e.g., describing in more detail operations mentioned with reference to blocks 220 and 322 hereinabove. Note FIG. 4 is described for illustrative purposes only, and is not meant to limit the scope of the present disclosure to any particular implementations or functional partitioning of the blocks described. In certain exemplary embodiments, one or more of the functional blocks or modules shown in FIG. 4, e.g., computer 420 and any of devices 310.n, may be integrated into a single module. Conversely, functionality performed by a single module may be partitioned across multiple modules alternatively from what is shown. Such alternative exemplary embodiments are contemplated to be within the scope of the present disclosure.

In FIG. 4, a plurality of audio input/output devices 310.1 through 310.N is shown, and each device may have an architecture similar to device 310 described hereinabove with reference to FIG. 3. In particular, for each device 310.n (wherein n represents a generic index from 1 to N), block 322, earlier described hereinabove as performing operations resulting in the recovering or retrieving of relevant information from corresponding digital sound waveform 320a, is depicted. In particular, block 322.1, corresponding to block 322 for a first audio input/output device 310.1, performs digital sound processing functionality, and includes a communications receive and transmit (RX/TX) module 410.1. Similarly, block 322.n, corresponding to block 322 for an n-th audio input/output device 310.n, performs its own digital sound processing functionality, and includes a communications receive and transmit (RX/TX) module 410.n, etc. Communications between block 322.n and block 422 may be conducted over channel 322.na.

In an exemplary embodiment, block 322.1 may correspond to block 322 for earbuds 120, block 322.2 may correspond to block 322 for smartphone 130, etc. In an exemplary embodiment wherein N equals 1, only one block 322.1 may be present in the system. Such alternative exemplary embodiments are contemplated to be within the scope of the present disclosure.

In FIG. 4, module 410.n of each corresponding block 322.n communicates with one or more other entities remote from the corresponding device 310.n, e.g., over a wireless or wired channel. In an exemplary embodiment, communications may be conducted between each module 410.n and communications module 422 of computer 420. Computer 420 may correspond to a central processing unit for processing audio input and/or other input signals from devices 310.1 through 310.N. In particular, computer 420 may include multi-channel signal processing module 425 for collectively processing audio input signals and/or other data received from blocks 322.1 through 322.N.

In an exemplary embodiment, multi-channel signal processing module 425 may include information extraction/retrieval block 428. Block 428 may extract information from the multiple audio input signals and/or other data received. Block 428 may include query formulation block 428.1, which formulates query 428.1a from the digital sound waveforms and/or other data received. Block 428 may further include results retrieval block 428.2, which retrieves results responsive to query 428.1a from online engine 430.

In an exemplary embodiment, block 428.1 is configured to formulate query 428.1a by concatenating multiple digital sound waveforms. In this sense, formulated query 428.1a is also denoted a digital-sound-enabled query, i.e., a query containing a digital sound waveform as one or more of the query search terms. For example, referring to scenario 100, query 428.1a may contain multiple digital sound waveforms as query search terms, with each digital sound waveform encapsulated as a standard audio file (such as mp3, way, etc.). Each digital sound waveform may correspond to a sound waveform received by one of devices 120, 130, 140, or 150. In illustrative scenario 100 wherein bird song 162 is received by each of devices 120, 130, 140, 150, then formulated query 428.1a may contain up to four digital sound waveforms corresponding to the versions of bird song 162 as received by each of the four devices. In alternative exemplary embodiments, any number of digital sound waveforms may be concatenated by block 428.1 to generated formulated query 428.1a.

When processing digital-sound-enabled queries, online engine 430 may be configured to retrieve and rank online results based on similarity or correspondence of the online results to one or more digital sound waveforms contained in the query. In an exemplary embodiment, relevance of a digital sound waveform to a sound record in an online database may be at least in part determined based on sound pattern recognition and matching techniques, and may take advantage of techniques known in the arts of voice recognition, sound recognition, pattern recognition, etc. For example, one or more correlation metrics between a recorded sound and a candidate sound may be calculated. In an exemplary embodiment, such calculations may be additionally informed by knowledge of other parameters, as contained in formulated query 428.1a as described hereinabove.

In an exemplary embodiment, other data included in formulated query 428.1a may include, e.g., an annotation of each digital sound waveform with data identifying the device that captured the sound waveform, and/or descriptive of the circumstances under which the sound waveform was captured. For example, a version of bird song 162 captured by smartphone 130 may be annotated with data identifying the hardware model/version number of smartphone 130, as well as positional data of smartphone 130 (e.g., as derived from a GPS component of smartphone 130), relative positional data of smartphone 130 versus other of devices 120, 140, 150, etc., velocity of smartphone 130, ambient temperature as measured by a temperature sensor of smartphone 130, etc. When included as part of formulated query 428.1a, such data may be utilized by an online engine to more accurately identify bird song 162, as well as retrieve more relevant information.

In an exemplary embodiment, formulated query 428.1a may further include other data besides audio waveforms and data descriptive of such waveforms. For example, such data may include parameters such as user profile and/or usage patterns of the user, geographical location of the device(s) as determined by Global Positioning System (GPS) and/or other techniques, positions of the devices relative to each other, other parameters, etc.

To facilitate the identifying and matching submitted query sounds with relevant online results, online engine 430 may maintain sound index 434. Index 434 may include, e.g., categorized listings of online-accessible sound models and/or sounds that are deemed relevant and/or useful in satisfying search queries containing sound files.

In an exemplary embodiment, query formulation block 428.1 may record (e.g., audio and non-audio) information received from devices 310.n to assist in assessing and predicting query formulations that will likely be useful to the user. In an exemplary embodiment, block 428.1 may include an optional machine learning module (not shown) that learns to map input received from devices 310.n to relevant query formulations with increasing accuracy over time.

Formulated query 428.1a is submitted from computer 420 to online engine 430, e.g., over a wired or wireless connection. In an exemplary embodiment, online engine 430 may be an online search engine accessible over the Internet. Online engine 430 may retrieve relevant results 430a responsive to query 428.1a. Results 430a may subsequently be communicated by online engine 430 back to computer 420, and computer 420 may then convey the results back to any of devices 120, 130, 140, 150.

In an exemplary embodiment, the user may specifically designate one or more sounds for inclusion in a search query. For example, while listening to bird song 162, user 110 may explicitly indicate to the system (e.g., via voice command, hand gestures, text input, etc.) that a query is to be formulated and submitted based on the received sound input, e.g., immediately or within some predetermined time after listening to the sound of interest. In an exemplary embodiment, this explicit indication may automatically cause block 428.1a to formulate a query. In an exemplary embodiment, user 110 may further explicitly specify all or part of a query string to be included in the formulated query.

In an alternative exemplary embodiment, user 110 need not explicitly indicate that a query is to be formulate and submitted based on the received sound input. In such exemplary embodiments, an optional machine learning module (not shown) may "learn" an appropriate trigger point for automatically formulating a machine-generated query 428.1a based on the accumulated data received.

In an exemplary embodiment, online engine 430 may include a machine learning module 432 that learns to map queries 428.1a to relevant results with increasing accuracy over time. Module 432 may employ techniques derived from machine learning, e.g., neural networks, logistic regression, decision trees, etc. In an exemplary embodiment, channels 322.1a through 322.Na may convey certain training information to engine 430 that is useful to train machine learning module 432 of engine 430. For example, a user identity may be conveyed to machine learning module 432. Previously received sounds waveforms and/or retrieved results corresponding to such sound waveforms may also be conveyed to module 432. Such received data may be utilized by online engine 430 to train machine learning module 432 to better process and serve queries 428.1a.

As an illustrative example, user 110 in scenario 100 may have a corresponding user identity, e.g., associated with user alias "anne123." User alias anne123 may be associated with a corresponding user profile, e.g., identifying previous history of searches, user preferences, etc. Assuming such information is made available to train machine learning module 432 of search engine 430, search engine 430 may advantageously serve more relevant and accurate results to submitted queries.

For example, in response to a query submitted by anne123 which includes digital sound waveforms derived from bird song 162, search engine 430 may rank certain search results relating to "goldfinch" more highly based on knowledge that user anne123 resides in a specific geographical vicinity derived from the user profile, etc. Note the preceding discussion is provided for illustrative purposes only, and is not meant to limit the scope of the present disclosure to any particular types of information or techniques for processing and/or determining patterns in such information that may be employed by machine learning module 432.

FIG. 5 shows an illustrative correspondence between an exemplary formulated query 428.1a and exemplary retrieved results 430a. Note FIG. 5 is shown for illustrative purposes only, and is not meant to limit the scope of the present disclosure to any particular types of sounds, technical fields, query formulations, query fields, lengths or sizes of formulated queries, number or types of results, etc. Note any of the information shown may be omitted from any particular search query or any exemplary embodiment, depending on the particular configuration of the system. Furthermore, additional query fields not shown may readily be included in any particular search query or any exemplary embodiment, and may be readily accommodated using the techniques of the present disclosure. Such alternative exemplary embodiments are contemplated to be within the scope of the present disclosure.

In particular, an example formulated query 428.1a includes several fields as shown on left-hand side 501 of FIG. 5. In particular, the example formulated query 428.1a includes a first field 510 including digital sound waveform 510b encapsulated as an mp3 audio file 510a. First field 510 also includes additional attributes denoted Device 1 attributes 510c, corresponding to further parameters of a device used to capture digital sound waveform 510b, including type of device, sampling rate, geographical location, etc. Note the specific attributes are described herein for illustrative purposes only, and are not meant to limit the scope of the present disclosure. Example formulated query 428.1a further includes second field 511 and third field 512, having similar fields including sound waveforms encapsulated as audio files, and additional device attributes.

Query 428.1a also includes other parameters field 513, which may help online engine 430 retrieve more relevant search results. For example, field 513 may specify an identity of a user (e.g., to whom retrieved information is to be presented), a profile of such a user, a previous search history of such a user, ambient temperature (e.g., as measured by one or more devices), etc.

Upon submission of query 428.1a to online engine 430, query results 430a may be served responsive to query 428.1a. Exemplary query results 430a are shown on right side 551 of FIG. 5. Note the exemplary query results 430a in FIG. 5 are shown for illustrative purposes only, and are not meant to limit the scope of the present disclosure.

In particular, exemplary query results 430a include one or more visual results 560, including, e.g., graphic 561 and text 562 descriptive of results 560. For example, for the exemplary digital sound waveforms and other parameters submitted in the illustrative query 428.1a in FIG. 5, a graphic 561 of a goldfinch bird and corresponding text 562 descriptive of goldfinch behavior are shown. In an exemplary embodiment, visual results 560 may be displayed on devices local to the user having visual display capability, e.g., as further described hereinbelow with reference to FIG. 6.

Query results 430a may further or alternatively include one or more results containing content not meant to be visually displayed to a user. For example, query results 430a may include audio result 563, which includes a digital sound waveform corresponding to a speech rendition of text 564 relevant to search query 428.1a. Audio result 563 may be a computer-generated text-to-speech rendition of the corresponding text, or it may be read by a human speaker, etc. In an exemplary embodiment, any audio result(s) in query results 430a may be played back using a device local to the user, e.g., earbuds 120 local to user 110, etc.

Audio results 563 may further or alternatively include personalized audio result 565, corresponding to digital sound waveforms customized for the user. For example, in the exemplary embodiment shown, a user's favorite song 566 (e.g., as determined by user profile parameters as submitted in query 428.1a or elsewhere) may be mixed 567 with a goldfinch song 568 (e.g., the bird song as extracted from any of the digital sound waveforms such as waveform 510b submitted in query 428.1a, or from a digital sound waveform associated with audio results 563 or any other results in query results 430a).

In an exemplary embodiment, to train machine learning algorithms running in online engine 430 to retrieve results with increasing relevance to formulated queries, user feedback may be received in the audio augmented reality system. For example, when presented with any of visual results 560 and audio results 563 (including personalized audio results 565), user 110 may select one of the presented results to retrieve further information relevant to the results. For example, when viewing text 562 in visual results 560, user 110 may express interest in learning more about goldfinch migration by, e.g., submitting another query for "goldfinch migration" to online engine 430 through the available devices, or otherwise indicating that result 562 was deemed relevant by the user. Alternatively, when listening to a synthesized voice rendering 564 of audio results 563, user 110 may express interest in the synthesized audio information by, e.g., increasing the volume of the audio output, or otherwise submitting an additional query (e.g., through voice command or many entry of additional text) related to the retrieved results. Upon receiving user feedback indicating positive relevance of the retrieved results, online engine 430 may further adapt and/or train the underlying machine learning algorithms, e.g., executed by machine learning module 432, to retrieve relevant results responsive to formulated queries.

Figure 6:
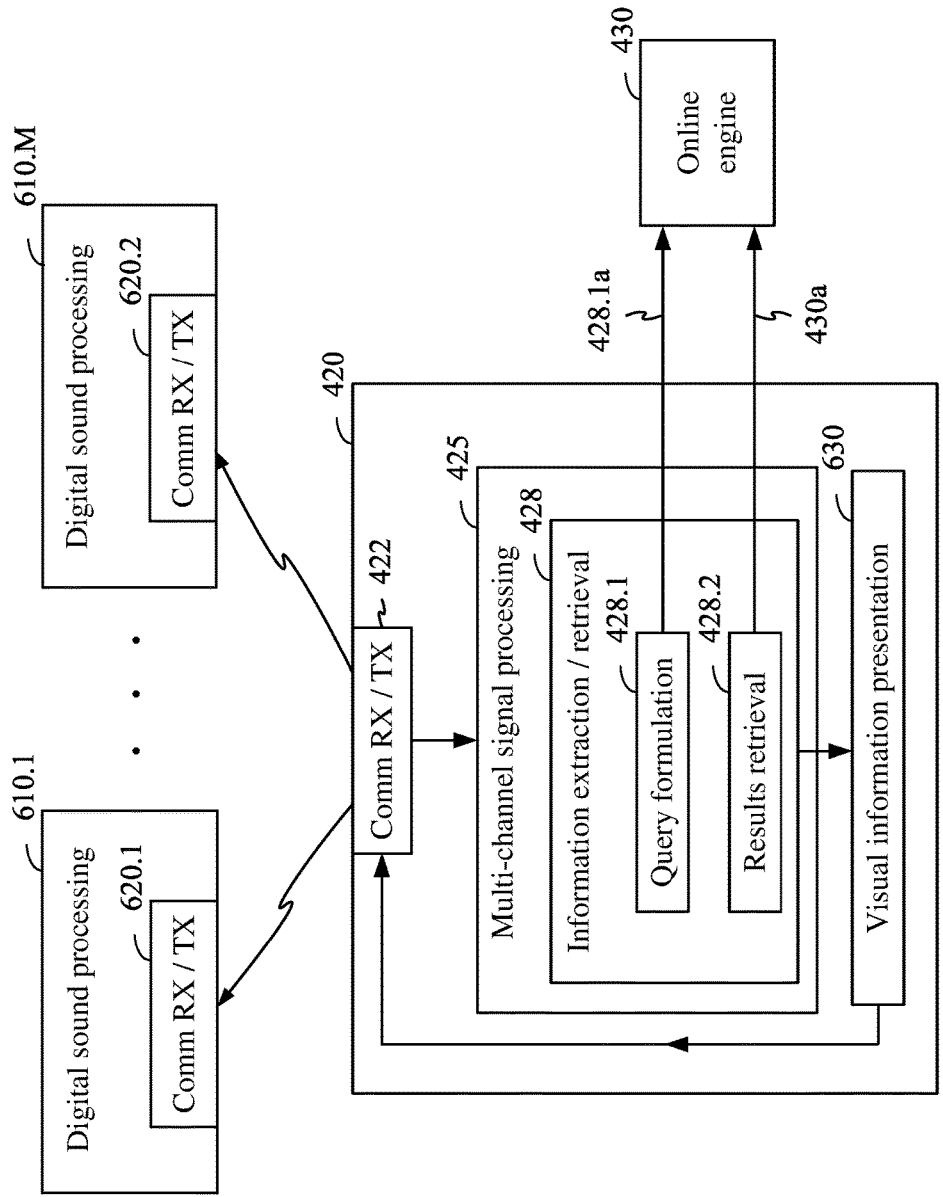
FIG. 6 illustrates further aspects of the augmented reality system for visually displaying information relevant to the received digital sound waveforms.

FIG. 6 illustrates further aspects of the augmented reality system for visually displaying information relevant to the received digital sound waveforms. Note FIG. 6 is described for illustrative purposes only, and is not meant to limit the scope of the present disclosure to any particular implementations or functional partitioning of the blocks described.

In FIG. 6, computer 420, e.g., corresponding to computer 420 described with reference to FIG. 4, is further communicatively coupled to one or more devices 610.1 through 610.M, each having a visual display, an arbitrary device being denoted herein as 610.m. In particular, any of devices 610.1 through 610.M may correspond to any of devices 130, 140, 150 earlier mentioned hereinabove, as long as such device has a visual display, e.g., smartphone 130, smartwatch 140, laptop 150, etc. Alternatively, any of devices 610.1 through 610.M may be a stand-alone device having no audio input capability, or otherwise receiving no audio input for use by the augmented reality system. Each device 610.m includes a communications RX/TX block 620 for communicating with block 422 of computer 420, e.g., directly, or via another intermediary device (not shown) such as a router, server, etc.

In an exemplary embodiment, computer 420 includes visual information presentation block 630 coupled to results retrieval block 428.2. In particular, retrieved results 430a may be formatted or otherwise collected for visual presentation and display by block 630, which transmits the formatted and/or collected results via communications block 422 to devices 610.1 through 610.M for visual display. For example, in a scenario wherein device 610.1 corresponds to a laptop computer with a display, then block 630 may format one or more retrieved results based on visual result 560 shown in FIG. 5, and subsequently transmit such formatted results to the laptop computer for display.

FIG. 7 illustrates an exemplary application of the techniques described hereinabove with reference to an audio augmented reality system to specific scenario 100. Note FIG. 7 is shown for illustrative purposes only, and is not meant to limit the scope of the present disclosure to any particular scenarios shown.

In FIG. 7, at block 210.1, a sound waveform, e.g., corresponding to bird song 162, is received by a plurality of devices 120, 130, 140. Devices 120, 130, 140 digitize the received sound waveforms into digital sound waveforms.

At block 220.1, the digital sound waveforms are transmitted by any or all of devices 120, 130, 140 to a central processing unit for remote processing. Note the central processing unit may be separate from devices 120, 130, 140, or it may be implemented on one or more of devices 120, 130, 140. In an exemplary embodiment, the central processing unit may perform such functions as described with reference to computer 420 in FIG. 4.

In an exemplary embodiment, query formulation may be performed by computer 420, e.g., as described with reference to block 428.1 hereinabove, and as also shown in FIG. 7. In particular, at block 428.1, a query may be formulated and submitted by computer 420 to online engine 430 to perform an online search. The query may include digital sound waveforms and other data, e.g., as described hereinabove with reference to FIG. 5.

As shown in FIG. 7, an exemplary online engine 430.1 may receive the formulated and submitted query from block 428.1. Online engine 430.1 may include machine learning module 432.1 configured to map queries 428.1a to relevant results with increasing accuracy.

In the specific scenario shown, module 432.1 is specifically configured to estimate the originating location of a sound waveform received by devices 120, 130, 140, using sound triangulation techniques. In particular, given that the same bird song 162 generates three distinct sound waveforms, corresponding to sound waveforms received at three separate devices, triangulation may be performed using the digital sound waveforms to determine the position of bird 160 with respect to the devices, and hence the user.

For example, sound triangulation may account for the relative delays of bird song 162 within each digital sound waveform (e.g., assuming each device is equipped with an accurate time reference as may be derivable from a GPS signal, etc.), frequency shifts in the received sounds due to motion of the source (e.g., bird 160) or of devices 120, 130, 140, etc.

Based on sound triangulation as described hereinabove, machine learning module 432.1 may be configured to triangulate the source of bird song 162, and hence the position of bird 160 relative to the user. Machine learning module 432.1 may further be configured to extract a standard version of bird song 162 from the multiple versions received, e.g., by accounting for any calculated frequency shifts and delays. Such a standard version of bird song 162 may then be correlated with sound models or samples such as might be available on the World Wide Web (WWW) 440, e.g., as may be referenced by sounds index 434 of online engine 430.1 as earlier described hereinabove with reference to FIG. 4. Following correlation, bird song 162 may be identified as corresponding to one or more particular bird species, which information may then further be used to extract relevant information as query results, e.g., results 430a as indicated in FIG. 5.

Based on the retrieved information, sound synthesis may be performed at block 710, and visual synthesis may be performed at block 712. For example, exemplary visual results may be as described with reference to results 560 in FIG. 5, while exemplary audio results may be as described with reference to results 563 or 565. In an exemplary embodiment, blocks 710, 712 may be individually or jointly implemented at either online engine 430.1, or at computer 420.

Following sound synthesis at block 710, at block 240.1, the synthesized sound may be output to the user, e.g., through earbuds 120. In an exemplary embodiment wherein, e.g., user 110 listens to the output of earbuds 120 at the same time as he or she listens to bird song 162, the synthesized sound output of earbuds 120 may constitute audio augmented reality, wherein the user receives real-time synthesized audio information relevant to sounds that are otherwise perceived naturally through the environment.

Following visual synthesis at block 712, at block 240.2, the synthesized visual information may be output to the user, e.g., through smartphone 140. The synthesized visual information may identify bird 160 to the user, as well as provide other relevant information.

Figure 8:
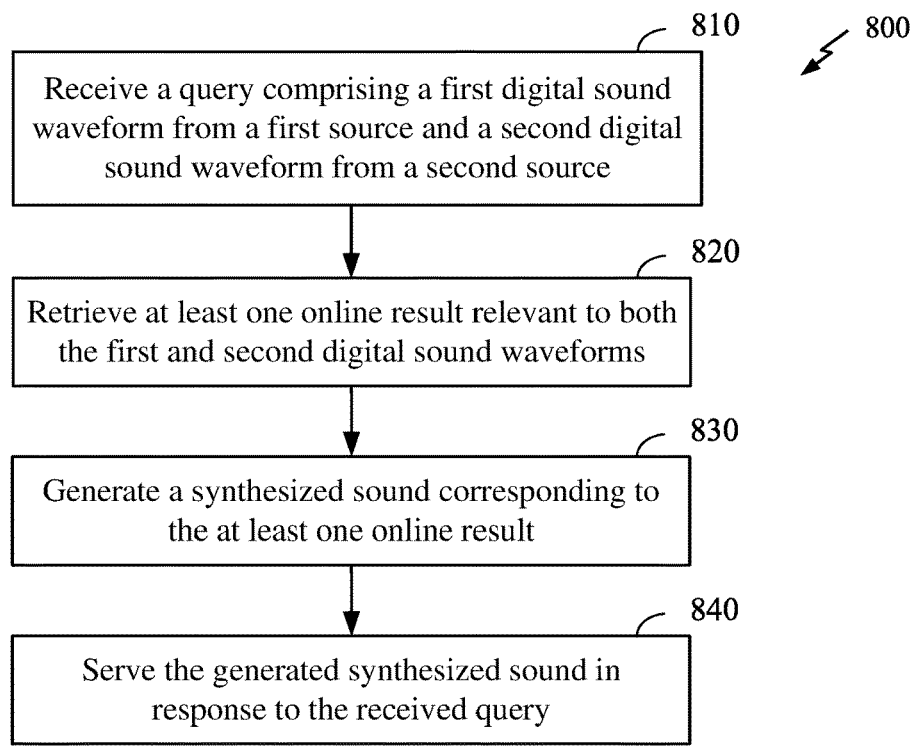
FIG. 8 illustrates an exemplary embodiment of a method according to the present disclosure.

FIG. 8 illustrates an exemplary embodiment of a method 800 according to the present disclosure. Note FIG. 8 is shown for illustrative purposes only, and is not meant to limit the scope of the present disclosure to any particular method shown.

In FIG. 8, at block 810, a query comprising a first digital sound waveform from a first source and a second digital sound waveform from a second source is received. In an exemplary embodiment, the first source and second source may correspond to distinct audio input devices having separate locations, e.g., any two of the plurality of devices 120, 130, 140, 150, etc., described with reference to FIG. 1. The first digital sound waveform may be recorded by the first source, and the second digital sound waveform may be recorded by the second source.

At block 820, at least one online result relevant to both the first and second digital sound waveforms is retrieved. In an exemplary embodiment, the first and second digital sound waveforms correspond to different recordings of the same sound event received by different sources, e.g., separate digital sound recordings of bird song 162.

At block 830, a synthesized sound corresponding to the at least one online result is generated.

At block 840, the generated synthesized sound is served in response to the received query.

Figure 9:
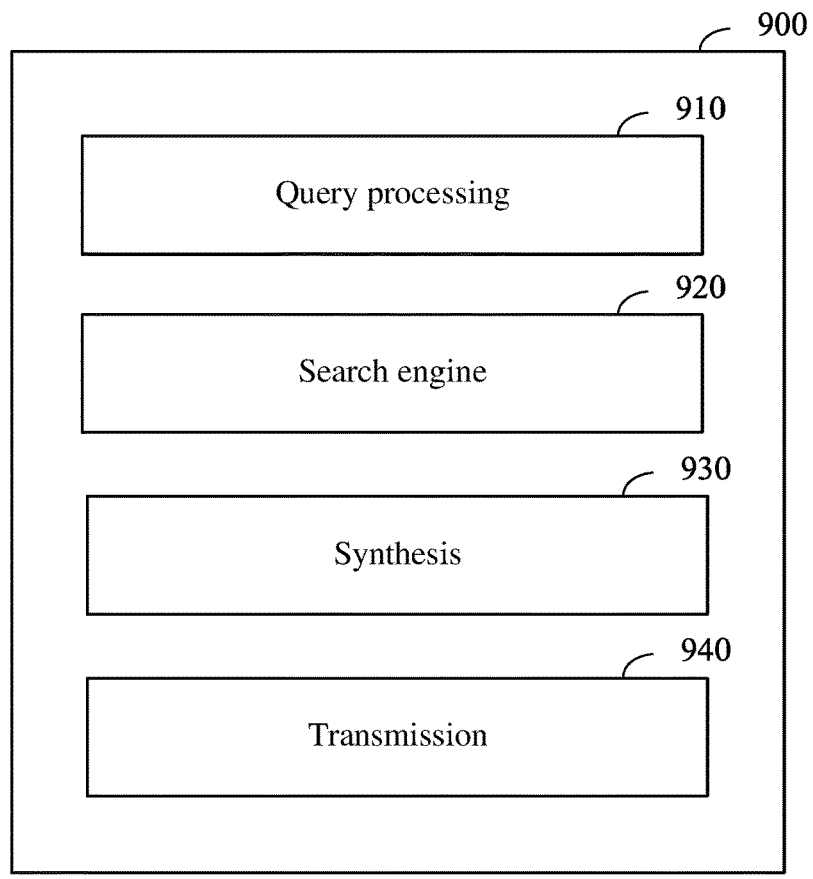
FIG. 9 illustrates an exemplary embodiment of an apparatus according to the present disclosure.

FIG. 9 illustrates an exemplary embodiment of an apparatus 900 according to the present disclosure. In FIG. 9, apparatus 900 includes a query processing module 910 configured to receive a query comprising a first digital sound waveform from a first source and a second digital sound waveform from a second source, a search engine 920 configured to retrieve at least one online result relevant to both the first and second digital sound waveforms, a synthesis module 930 configured to generate a synthesized sound corresponding to the at least one online result, and a transmission module 940 configured to serve the generated synthesized sound in response to the received query.

In an exemplary embodiment, structure for implementing module 910, search engine 920, module 930, and module 940 may correspond to, e.g., one or more server computers running remotely from devices used to capture the first and second digital sound waveforms, and communicating with such devices using a network connection, e.g., over the Internet. In an alternative exemplary embodiment, structure for implementing module 910 and search engine 920 may correspond to one or more server computers, while structure for implementing module 930 and module 940 may correspond to one or more processors residing on one or more devices used to capture the first and second digital sound waveforms. In particular, generating the synthesized sound may be performed at the server and/or at a local device. Such alternative exemplary embodiments are contemplated to be within the scope of the present disclosure.

Figure 10:
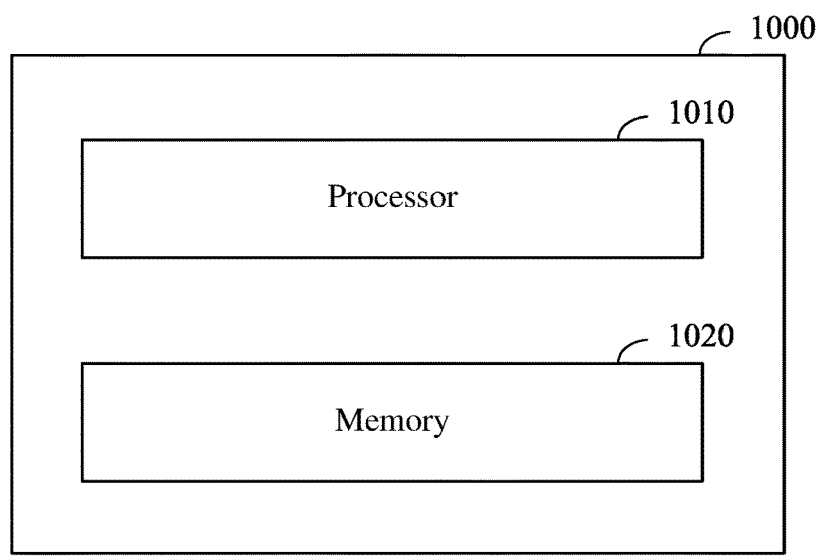
FIG. 10 illustrates an exemplary embodiment of a device according to the present disclosure.

FIG. 10 illustrates an exemplary embodiment of a device 1000 according to the present disclosure. In FIG. 10, a computing device 1000 includes a memory 1020 holding instructions executable by a processor 1010 to: receive a query comprising a first digital sound waveform from a first source and a second digital sound waveform from a second source; retrieve at least one online result relevant to both the first and second digital sound waveforms; generate a synthesized sound corresponding to the at least one online result; and serve the generated synthesized sound in response to the received query.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A method for collecting sound waveforms and generating a responsive synthesized sound output, the method comprising:
   receiving a query comprising a first digital sound waveform from a first source and a second digital sound waveform from a second source captured by at least one microphone, the query further comprising preference parameters of a user;
   retrieving using a network connectivity device a preferred sound file of the user as identified based on the preference parameters, and at least one online result relevant to both the first and second digital sound waveforms;
   synthesizing using computer sound synthesis hardware a sound comprising an audio mix of the preferred sound file of the user and the at least one online result relevant to both the first and second digital sound waveforms; and
   serving the synthesized sound in response to the received query.

2. The method of claim 1, the received query comprising at least three digital sound waveforms, each sound waveform being received by a device having a distinct location, the retrieving the at least one online result comprising:
   calculating a position of a source object based on the at least three digital sound waveforms, the calculating comprising determining a relative delay amongst the at least three digital sound waveforms, and determining relative positions of the distinct locations of the devices.

3. The method of claim 2, the synthesizing sound comprising generating a text-to-speech rendition of the calculated position.

4. The method of claim 1, the retrieving the at least one online result comprising:
   correlating each of the first and second digital sound waveforms with at least one online sound file, each sound file having corresponding identification information; the at least one online result comprising identification information corresponding to a sound file being the most highly correlated with the first and second sound waveforms.

5. The method of claim 1, the preference parameters of the user comprising a preferred music genre of the user, the preferred sound file comprising a music file containing music of the preferred music genre.

6. The method of claim 5, the at least one online result comprising a sound file corresponding to an object characterized by the first digital sound waveform and the second digital sound waveform, the synthesized sound comprising an audio mix of the sound file corresponding to the object and the music file.

7. The method of claim 1, further comprising:
   generating a synthesized visual output corresponding to the at least one online result; and
   serving the generated synthesized visual output in response to the received query.

8. The method of claim 1, further comprising:
   receiving an indication of user approval of the served synthesized sound; and
   based on the received indication of user approval, updating a machine learning algorithm used to retrieve the at least one online result relevant to the received query.

9. The method of claim 1, the first and second digital sound waveforms comprising at least one digital sound waveform captured by an active earbud, the active earbud further configured to receive and play back the synthesized sound served in response to the received query.

10. The method of claim 1, the at least one digital sound waveform comprising:
    at least one digital sound waveform received by a smartphone; and
    at least one digital sound waveform received by a smart watch.

11. An apparatus for collecting sound waveforms and generating a responsive synthesized sound output, the apparatus comprising:
    a query processing module configured to receive a query comprising a first digital sound waveform from a first source and a second digital sound waveform from a second source captured by at least one microphone, the query further comprising preference parameters of a user;
    a search engine configured to retrieve using a network connectivity device a preferred sound file of the user as identified based on the preference parameters, and at least one online result relevant to both the first and second digital sound waveforms;

a computer sound synthesis module configured to generate a synthesized sound comprising an audio mix of the preferred sound file of the user and the at least one online result relevant to both the first and second digital sound waveforms; and a transmission module configured to serve the synthesized sound in response to the received query.

12. The apparatus of claim 11, the received query comprising at least three digital sound waveforms, each sound waveform being received by a device having a distinct location, the search engine further configured to:

calculate a position of a source object based on the at least three digital sound waveforms, the calculating comprising determining a relative delay amongst the at least three digital sound waveforms, and determine relative positions of the distinct locations of the devices.

13. The apparatus of claim 12, the synthesis module further configured to generate a text-to-speech rendition of the calculated position.

14. The apparatus of claim 11, the search engine further configured to retrieve the at least one online result by correlating each of the first and second digital sound waveforms with at least one online sound file, each sound file having corresponding identification information; the at least one online result comprising identification information corresponding to a sound file being the most highly correlated with the first and second sound waveforms.

15. The apparatus of claim 11, the preference parameters of the user comprising a preferred music genre of the user, the preferred sound file comprising a music file containing music of the preferred music genre.

16. The apparatus of claim 15, the at least one online result comprising a sound file corresponding to an object characterized by the first digital sound waveform and the second digital sound waveform, the synthesized sound comprising an audio mix of the sound file corresponding to the object and the music file.

17. The apparatus of claim 11, the first and second digital sound waveforms comprising at least one digital sound waveform captured by an active earbud, the active earbud further configured to receive and play back the synthesized sound served in response to the received query.

18. The apparatus of claim 11, the at least one digital sound waveform comprising:

at least one digital sound waveform received by a smartphone; and at least one digital sound waveform received by a smart watch.

19. A computing device for collecting sound waveforms and generating a responsive synthesized sound output, the computing device including a memory holding instructions executable by a processor to:

receive a query comprising a first digital sound waveform from a first source and a second digital sound waveform from a second source captured by at least one microphone, the query further comprising preference parameters of a user;

retrieve using a network connectivity device a preferred sound file of the user as identified based on the preference parameters, and at least one online result relevant to both the first and second digital sound waveforms;

generate using a computer sound synthesis module a synthesized sound comprising an audio mix of the preferred sound file of the user and the at least one online result relevant to both the first and second digital sound waveforms; and serve the synthesized sound in response to the received query.

20. The device of claim 19, the memory further holding instructions executable by the processor to:

receive an indication of user approval of the served synthesized sound; and based on the received indication of user approval, update a machine learning algorithm used to retrieve the at least one online result relevant to the received query.

* * * * *